3,159,584
COPPER ACTIVATED ALKALINE EARTH METAL-ALKALI METAL ORTHOPHOSPHATE LUMINESCENT MATERIAL
Willem Lambertus Wanmaker and Cornelis Bakker, both of Emmasingel, Eindhoven, Netherlands, assignors to North American Philips Company, Inc., New York, N.Y., a corporation of Delaware
Filed July 28, 1961, Ser. No. 127,713
Claims priority, application Netherlands Sept. 22, 1960
3 Claims. (Cl. 252—301.4)

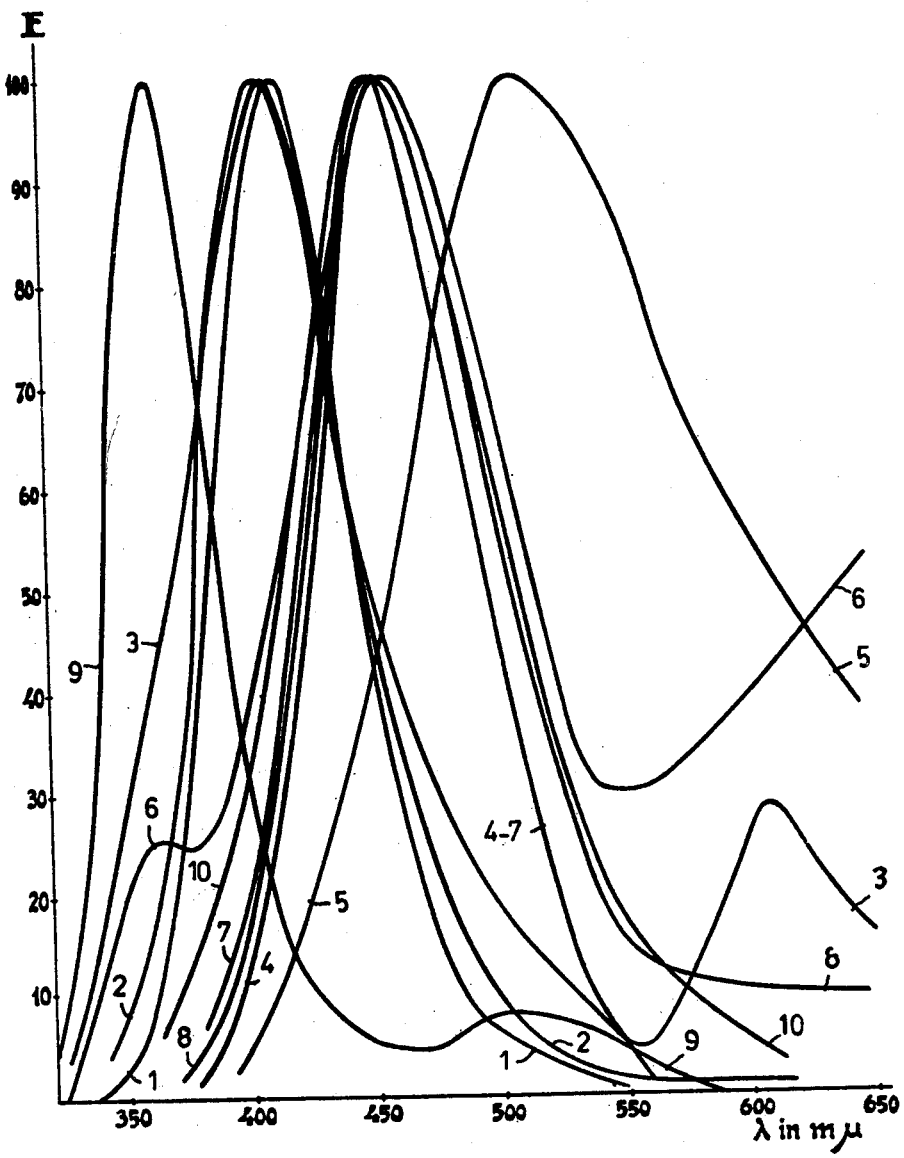

The invention relates to a source of radiation comprising the combination of a mercury-vapor discharge tube and a luminescent layer. The invention also relates to a luminescent substance suitable for use in such a luminescent layer, and to a method of producing such a substance.

Radiation sources of the above-mentioned kind, in which the ultra-violet radiation of the mercury-vapor discharge is converted by the luminescent layer to radiation of greater wavelengths, are used for widely different purposes. In accordance with the purpose, the luminescent substance or the mixture of substances in the luminescent layer is chosen so that the radiation emitted has the desired intensity in a predetermined part of the spectrum.

When radiation sources of the above-mentioned kind are used for irradiating living organisms, for example plants, and photo-sensitive substances which may be used in blue-printing, luminescent substances having an emission spectrum showing steep peaks are desired.

In both cases, pigments having absorption curves showing comparatively steep peaks are irradiated and hence it is desirable for a large part of the emission of the radiation source to be emitted within the part of the spectrum which falls within these absorption curves. Thus, not only is the radiation from the source of radiation utilized to highest advantage, but also side effects are avoided. In particular in living organisms, there frequently are a number of substances responsive to radiation which have absorption curves showing closely adjacent steep peaks. Hence, if only one of these radiation-sensitive substances is to be influenced, it is desirable for the radiation of the source to be absorbed as little as possible by the other substances. This can be ensured by means of a radiation source having a sharp emission peak at the desired wavelengths. The invention relates to radiation sources of this kind.

According to the invention, a source of radiation comprises the combination of a mercury-vapor discharge tube and a luminescent layer, and is characterized in that this layer contains a luminescent substance which is activated with monovalent copper and, as the case may be, with bivalent manganese and can be represented by the formula:

$$xAO.yB_2O.zP_2O_5.pCu_2O.qMnO.mAl_2O_3$$

where A represents at least one of the alkaline earth metals calcium, strontium and barium and B represents at least one of the alkali metals lithium, sodium and potassium, which substance satisfies the following conditions:

(a) $2.50 \leq \dfrac{x+y+p+q+3m}{z} \leq 3.10$ (b) $1.60 \leq \dfrac{x}{y} \leq 3.54$ (c) $0.0025 \leq \dfrac{p}{z} \leq 0.04$ (d) $0.00 \leq \dfrac{q}{z} \leq 0.25$ (e) $0.00 \leq \dfrac{m}{z} \leq 0.075$ The substances represented by the above formula are essentially orthophosphates of alkaline earth metals and alkali metals. This may be shown by X-ray diffraction photographs.

As will be seen from the above-mentioned conditions, both the manganese and the aluminum may be omitted.

The phosphates according to the invention are substantially excited by ultra-violet radiation having a wavelength of less than 300 m$\mu$. In a low-pressure mercury-vapor discharge, the radiation at 253.7 m$\mu$ is particularly strong and hence the prosphates according to the invention may be used to advantage in combination with a low-pressure mercury-vapor discharge tube. However, as a high-pressure mercury-vapor discharge tube also emits a sufficiently intense radiation at 253.7 m$\mu$, the combination with such a discharge tube is also very useful.

The activator is monovalent copper which may be combined with bivalent manganese. If copper only is used as the activator, the peaks of the emission curves lie between 350 m$\mu$ and 520 m$\mu$; if manganese is also used as an activator, a second emisison peak is produced at a higher wavelength between 600 m$\mu$ and 700 m$\mu$.

The phosphates which in addition to the alkaline earth and alkali metals incorporate aluminum, in general have a higher light output than the phosphates containing no aluminum. The maximum of the emission is hardly shifted by the use of aluminum. Presumably, the higher light output owing to the use of aluminum is due to the fact that the copper is better incorporated in the crystal lattice of the luminescent phosphates.

The ratio is determined by the condition (a) is preferably chosen between 2.95 and 3.05, the ratio determined by the condition (b) between 1.60 and 2.30 and the ratio of the condition (c) between 0.01 and 0.03. If manganese is present, the ratio determined by the condition (d) is preferably chosen between 0.05 and 0.10. If aluminum is present, the ratio determined by the condition (e) is preferably chosen between 0.03 and 0.05. With these preferred ratios the highest light output is obtained.

Since the copper must be present in the monovalent modification and the manganese in the bivalent modification, the phosphates have to be produced in a non-oxidizing, preferably weakly reducing atmosphere. It has, however, proved possible for a mixture of compounds, from which the luminescent phosphates are produced by heating, to be heated in an oxidizing atmosphere and for the product of this heating to be subsequently fired in a reducing atmosphere, the desired valency of the copper and, as the case may be, of the manganese being obtained. Consequently, the invention also relates to a method in which a mixture of compounds of at least one of the elements from the group A together with the compounds of at least one of the elements from the group B and a copper compound, as the case may be, aluminum and manganese compounds, from which the activated luminescent substances are produced by heating, is heated in a reducing atmosphere at a temperature between 850° and 1250° C. for from 1 to 2 hours. The invention also includes a method in which a mixture of compounds of at least one of the elements from the group A together with compounds of at least one of the elements from the group B and a compound of copper and, as the case may be, aluminum and manganese compounds, from which the activated luminescent substances are produced by heating, is heated to a temperature between 850° and 1250° C., after which the product of this heat treatment is heated to a temperature between 600° C. and 1250° C. in a reducing atmosphere for from 1 to 2 hours.

This latter method frequently gives better results, since the crystal lattice is more readily formed in an oxidizing atmosphere. In the second firing process, the copper need only be converted from the bivalent to the monovalent modification. This may be effected at lower temperatures, so that less sintering occurs.

The reducing atmosphere may be a mixture of hydrogen and nitrogen.

Among the compounds proposed by the above-mentioned formula, the orthophosphate of strontium and lithium, which is activated with copper only, has a special position. This phosphate on excitation by ultra-violet radiation having a wavelength of 253.7 m$\mu$ emits a radiation having a steep emission peak at 415 m$\mu$. Since the substances most commonly used in blue-printing have a maximum sensitivity between 400 m$\mu$ and 450 m$\mu$, this phosphor is highly suited for blue printing in combination with low-pressure mercury-vapor discharge tubes. By incorporating the aluminum in this phosphor, the light output is greatly increased.

The invention will now be described more fully with reference to a number of examples of the production of substances of various compositions. In each example, reference is made to an emission curve shown in the graph of the drawing, which curve is obtained by the excitation of the substance of the example by a radiation having a wavelength of 253.7 m$\mu$. In this graph, the wavelengths in millimicrons are plotted as the abscissae and the light outputs in arbitrary units are plotted as the ordinates. The maximum emission is converted to a value 100 in each case. The absolute light outputs of the substances depend in a comparatively high degree upon the conditions of production. The substances are highly sensitive to slight variations in these conditions, for example in the reactivity of the mixed starting materials, the grain size, the position in the furnace, and so on. If, however, the methods described above are followed, a reaction product is obtained which largely consists of a substance satisfying the formula and the conditions given above and having the desired crystal structure.

*Examples*

I. A mixture of:

50.30 g. of $SrHPO_4$
11.09 g. of $Li_2CO_3$
0.53 g. of $CuSO_4.5H_2O$
2.08 g. of $(NH_4)_2HPO_4$ is heated in a furnace to a temperature of 1100° C. in a stream of nitrogen and hydrogen for 1 hour. After cooling in the furnace, the reaction product is comminuted and, if required, is sieved. It is then ready for use.

The emission curve is designated 1 in the drawing.

The substance having this emission satisfies the conditions:

$a=3.00$
$b=1.84$
$c=0.0075$
$d=0$
$e=0$

II. A mixture of:

35.50 g. of $SrHPO_4$
7.09 g. of $Li_2CO_3$
0.37 g. of $CuSO_4.5H_2O$
0.08 g. of $Al_2O_3$
0.46 g. of $(NH_4)_2HPO_4$ is heated in a furnace to a temperature of 1100° C. in a stream of nitrogen and hydrogen for 1 hour. After cooling in the furnace, the reaction product is pulverized and, if required, is sieved. It is then ready for use.

The emission curve is designated 2 in the drawing.

The substance having this emission satisfies the conditions:

$a=2.90$
$b=2.00$
$c=0.0075$
$d=0$
$e=0.0075$

III. A mixture of:

46.90 g. of $SrHPO_4$
11.62 g. of $Li_2CO_3$
0.36 g. of $CuSO_4.5H_2O$
0.55 g. of $MnNH_4PO_4$
0.58 g. of $Al_2O_3$
4.14 g. of $(NH_4)_2HPO_4$ is heated in a furnace to a temperature of 1000° C. in air for 1 hour. The resulting reaction product is cooled, pulverized and, if required, sieved. The product is then heated again in a furnace to a temperature of 750° C. in a stream of nitrogen and hydrogen for 1.5 hours. After being cooled in the furnace, the reaction product is pulverized and, if required, sieved. It is now ready for use.

The emission curve is designated 3 in the drawing.

The substance having this emission satisfies the conditions:

$a=3.05$
$b=1.64$
$c=0.005$
$d=0.02$
$e=0.04$

IV. A mixture of:

54.60 g. of $BaCO_3$
37.68 g. of $(NH_4)_2HPO_4$
11.09 g. of $Li_2CO_3$
0.53 g. of $CuSO_4.5H_2O$ is heated in a furnace to a temperature of 1000° C. in air for 1 hour. The resulting reaction product is cooled, pulverized and, if required, sieved. The product is then heated again in a furnace to a temperature of 750° C. in a stream of nitrogen and hydrogen for 1.5 hours. After having been cooled in the furnace, the reaction product is pulverized and, if required, sieved. It is now ready for use.

The emission curve is designated 4 in the drawing.

The substance having this emission satisfies the conditions:

$a=3.00$
$b=1.84$
$c=0.0075$
$d=0$
$e=0$

V. A mixture of:

35.50 g. of $SrHPO_4$
10.18 g. of $Na_2CO_3$
0.37 g. of $CuSO_4.5H_2O$
0.08 g. of $Al_2O_3$
0.46 g. of $(NH_4)_2HPO_4$ is heated in a furnace to a temperature of 1100° C. in a stream of nitrogen and hydrogen for 1 hour. After having been cooled in the furnace, the reaction product is pulverized and, if required, sieved. It is now ready for use.

The emission curve is designated 5 in the drawing.

The substance having this emission satisfies the conditions:

$a=2.90$
$b=2.00$
$c=0.0075$
$d=0$
$e=0.0075$

VI. A mixture of:

54.60 g. of $BaCO_3$
37.68 g. of $(NH_4)_2HPO_4$
15.88 g. of $Na_2CO_3$
0.53 g. of $CuSO_4.5H_2O$ is heated in a furnace to a temperature of 1000° C. in air for 1 hour. The resulting reaction product is cooled, pulverized and, if required, sieved. The product is again heated in a furnace to a temperature of 750° C. in a stream of nitrogen and hydrogen for 1.5 hours. After having been cooled in the furnace, the reaction product is pulverized and, if required, sieved. It is now ready for use.

The emission curve is designated 6 in the drawing.

The substance having this emission satisfies the conditions:

$$a=3.00$$
$$b=1.84$$
$$c=0.0075$$
$$d=0$$
$$e=0$$

VII. A mixture of:

7.04 g. of $SrHPO_4$
36.12 g. of $BaHPO_4$
7.02 g. of $Li_2CO_3$
0.40 g. of $CuSO_4.5H_2O$
0.08 g. of $Al_2O_3$
0.66 g. of $(NH_4)_2HPO_4$ is heated in a furnace to a temperature of 1100° C. in a stream of nitrogen and hydrogen for 1 hour. After having been cooled in the furnace, the reaction product is pulverized and, if required, sieved. It is now ready for use.

The emission curve is designated 7 in the drawing.

The substance having this emission satisfies the conditions:

$$a=2.90$$
$$b=2.00$$
$$c=0.008$$
$$d=0$$
$$e=0.008$$

VIII. A mixture of:

51.40 g. of $BaCO_4$
37.68 g. of $(NH_4)_2HPO_4$
5.81 g. of $Li_2CO_3$
0.36 g. of $CuSO_4.5H_2O$
0.58 g. of $Al_2O_3$
8.32 g. of $Na_2CO_3$ is heated in a furnace to a temperature of 1000° C. in air for 1 hour. The resulting reaction product is cooled, pulverized and, if required, sieved. The product is then heated again in a furnace to a temperature of 750° C. in a stream of nitrogen and hydrogen for 1.5 hours. After having been cooled in the furnace, the reaction product is pulverized and, if required, sieved. It is now ready for use.

The emission curve is designated 8 in the drawing.

The substance having this emission satisfices the conditions:

$$a=3.05$$
$$b=1.66$$
$$c=0.005$$
$$d=0$$
$$e=0.04$$

IX. A mixture of:

37.80 g. of $CaHPO_4$
20.72 g. of $LiCO_3$
0.53 g. of $CuSO_4.5H_2O$
1.51 g. of $(NH_4)_2HPO_4$ is heated in a furnace to a temperature of 1000° C. in air for 1 hour. The resulting reaction product is cooled, pulverized and, if required, sieved. The product is then again heated in a furnace to a temperature of 750° C. in a stream of nitrogen and hydrogen for 1.5 hours. After having been cooled in the furnace, the reaction product is pulverized and, if required, sieved. It is now ready for use.

The emission curve is designated 9 in the drawing.

The substance having this emission satisfies the conditions:

$$a=3.00$$
$$b=1.84$$
$$c=0.0075$$
$$d=0$$
$$e=0$$

X. A mixture of:

47.10 g. of $SrHPO_4$
10.86 g. of $K_2CO_3$
5.81 g. of $Li_2CO_3$
0.36 g. of $CuSO_4.5H_2O$
0.58 g. of $Al_2O_3$
4.53 g. of $(NH_4)_2HPO_4$ is heated in a furnace to a temperature of 1000° C. in air for 1 hour. The resulting reaction product is cooled, pulverized and, if required, sieved. The reaction product is again heated in a furnace at a temperature of 750° C. in a stream of nitrogen and hydrogen for 1.5 hours. After having been cooled in the furnace, the reaction product is pulverized and, if required, sieved. It is now ready for use.

The emission curve is designated 10 in the drawing.

The substance having this emission satisfies the conditions:

$$a=3.05$$
$$b=1.65$$
$$c=0.005$$
$$d=0$$
$$e=0.04$$

What is claimed is:

1. A copper activated alkaline earth metal orthophosphate luminescent material, said luminescent material containing at least one alkali metal of the group consisting of lithium, sodium and potassium and having a structure satisfying the formula:

$$xAO.yB_2O.zP_2O_5.pCu_2O.qMnO.mAl_2O_3$$

wherein A represents at least one alkaline earth metal selected from the group consisting of calcium, strontium and barium, B represents at least one alkali metal selected from the group consisting of lithium, sodium and potassium and the following conditions are met:

(a) $2.50 \leq \dfrac{x+y+p+q+3m}{z} \leq 3.10$;

(b) $1.60 \leq \dfrac{x}{y} \leq 3.54$;

(c) $0.0025 \leq \dfrac{p}{z} \leq 0.04$;

(d) $0.00 \leq \dfrac{q}{z} \leq 0.25$; and (e) $0.00 \leq \dfrac{m}{z} \leq 0.075$;

said luminescent material when excited by ultra-violet radiation of a wavelength of less than 300 m$\mu$ exhibiting a single emission peak between about 350 m$\mu$ and 520 m$\mu$.

2. The luminescent material of claim 1 wherein the following conditions are met:

(a) $2.95 < \dfrac{x+y+p+3m}{z} < 3.05$;

(b) $1.60 < \dfrac{x}{y} < 2.30$;

(c) $0.01 < \dfrac{p}{z} < 0.03$;

(d) 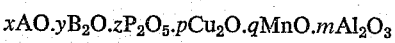 $\dfrac{q}{z} = 0.00$; and (e) $0.03 < \dfrac{m}{z} < 0.05$.

3. A copper activated strontium - lithium - orthophosphate having a structure satisfying the formula:

$$x\text{SrO}.y\text{Li}_2\text{O}.z\text{P}_2\text{O}_5.p\text{Cu}_2\text{O}.m\text{Al}_2\text{O}_3$$

wherein the following conditions are met:

(a) $2.95 < \dfrac{x+y+p+3m}{z} < 3.05$;

(b) $1.60 < \dfrac{x}{y} < 2.30$;

(c) $0.01 < \dfrac{p}{z} < 0.03$; and (d) $0.03 < \dfrac{m}{z} < 0.05$;

said luminescent material when activated by radiation of about 253.7 m$\mu$ exhibiting radiation with a sharp peak at about 415 m$\mu$.

References Cited in the file of this patent

UNITED STATES PATENTS

| | | |
|---|---|---|
| 2,968,626 | Rimbach | Jan. 17, 1961 |
| 2,976,249 | Rimbach et al. | Mar. 21, 1961 |
| 2,986,529 | McKeag | May 30, 1961 |
| 3,067,145 | Ropp | Dec. 4, 1962 |
| 3,110,680 | Koelmans et al. | Nov. 12, 1963 |

FOREIGN PATENTS

| | | |
|---|---|---|
| 155,658 | Australia | Mar. 12, 1954 |

OTHER REFERENCES

Korger: "Some Aspects of the Luminescence of Solids," Elsevier Pub. Co. Inc., New York, 1948, pages 270–272.

Uehara et al.: Fluorescent Orthophosphates, Chemical Abstracts, volume 52, 1958, pages 8754i–8755a, b.

UNITED STATES PATENT OFFICE
CERTIFICATE OF CORRECTION

Patent No. 3,159,584　　　　　　　　　　　　　　　December 1, 1964

Willem Lambertus Wanmaker et al.

It is hereby certified that error appears in the above numbered patent requiring correction and that the said Letters Patent should read as corrected below.

Column 2, line 31, strike out "is", first occurrence; line 55, after "compound" insert -- and --; column 5, line 54, for "satisfices" read -- satisfies --.

Signed and sealed this 17th day of August 1965.

(SEAL)
Attest:

ERNEST W. SWIDER
Attesting Officer

EDWARD J. BRENNER
Commissioner of Patents